April 7, 1942.　　　P. L. CALVERT　　　2,278,768
POWER DRIVE FOR PIPE THREADING MACHINES
Filed May 31, 1941　　　3 Sheets-Sheet 3
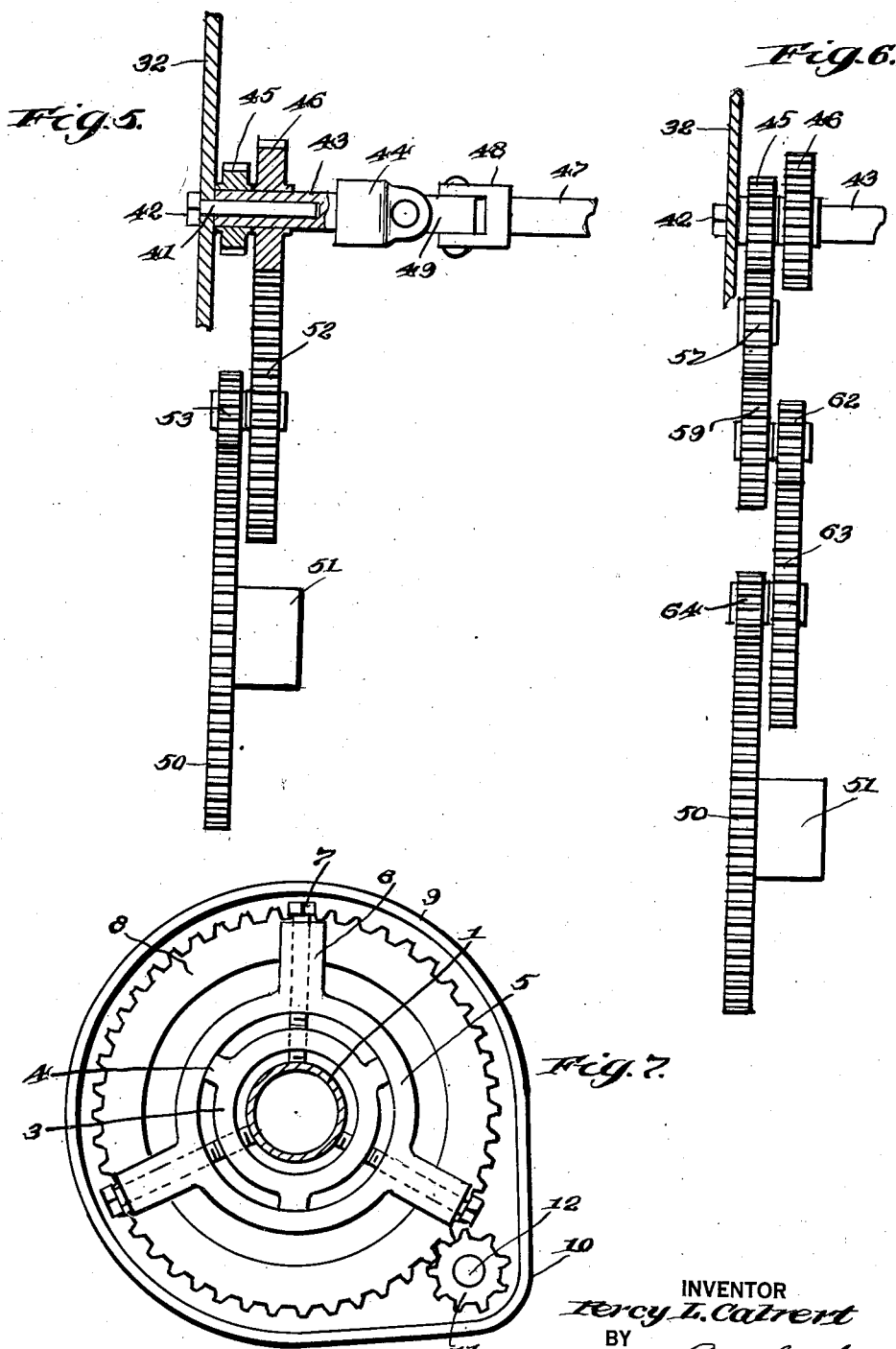
INVENTOR
Percy L. Calvert
BY
Carl H. Crawford
ATTORNEY Patented Apr. 7, 1942

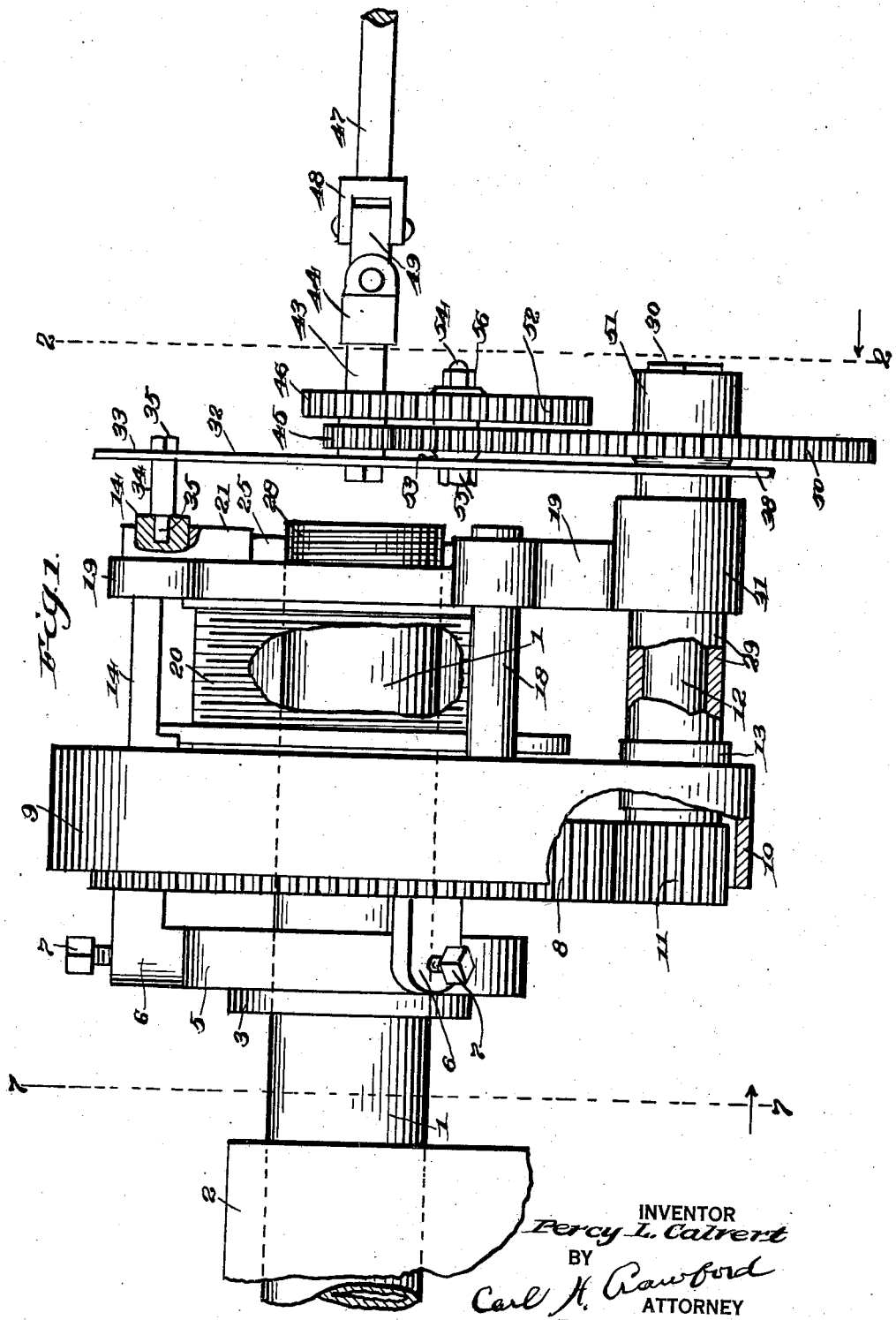

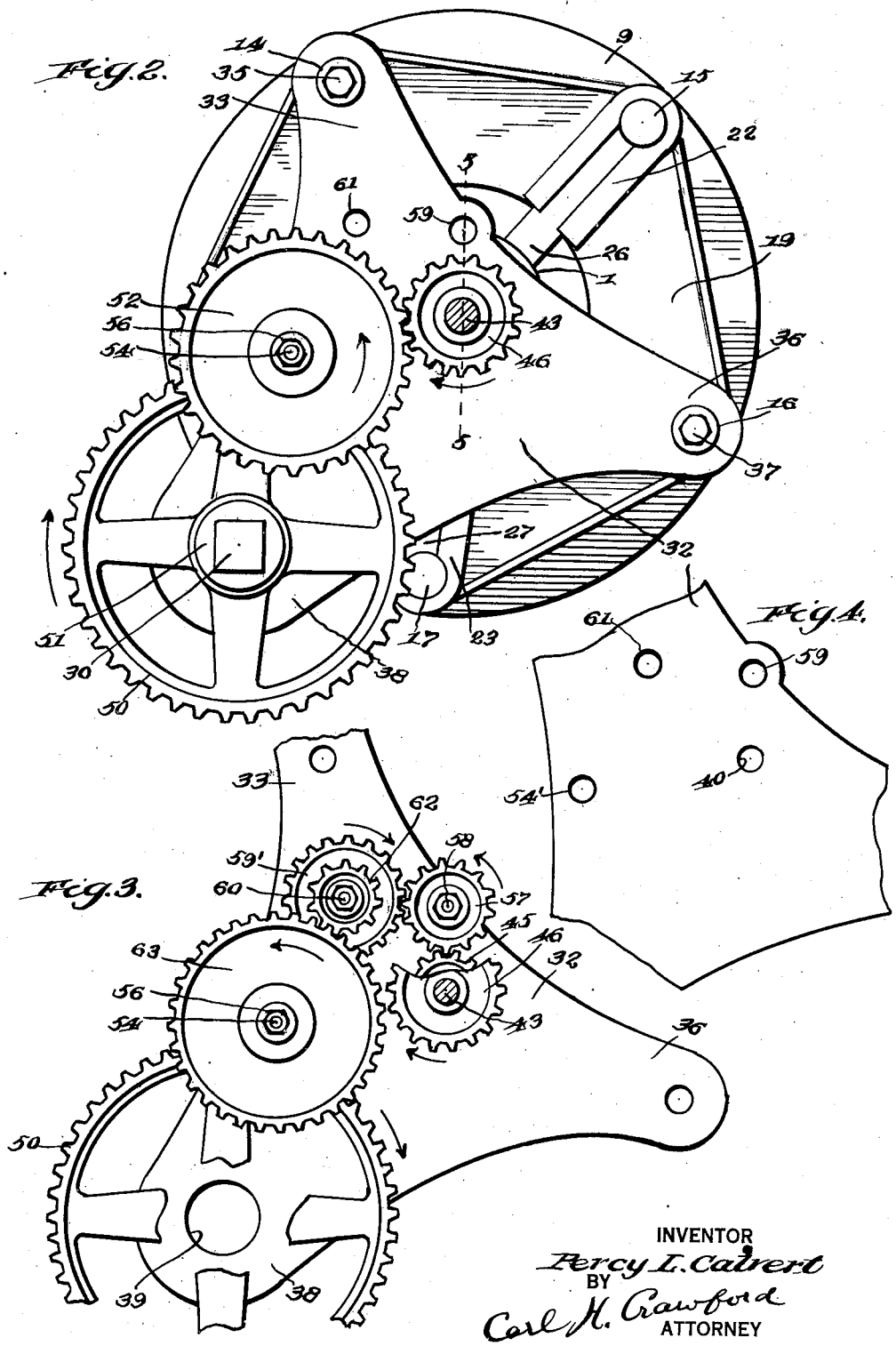

2,278,768

UNITED STATES PATENT OFFICE 2,278,768

POWER DRIVE FOR PIPE THREADING MACHINES

Percy L. Calvert, Walla Walla, Wash.

Application May 31, 1941, Serial No. 396,120

10 Claims. (Cl. 10—89)

The object of this invention is to provide a speed reduction power drive for pipe threading machines.

Pipe threading machines are in the class of relatively heavy duty equipment, and heretofore it has been the custom to operate such machines by hand power with a ratchet lever arrangement applied to the stock driving shaft. In addition to the fact that this old method was extremely laborious, and often required the services of two men, especially for larger size pipes, it also consumed a considerable amount of time.

It is a primary object of this invention to provide a speed reduction power drive mechanism that can either be made as a part of the original equipment of the pipe threading machine, or as an accessory that can later be applied to any of the present types of pipe threading machines, and therefore this invention not only resides in the combination of my speed reduction power drive mechanism with a pipe threading machine, but also as a new and useful article of manufacture.

It is a feature of this invention to provide a mechanism whereby pipes of any diameter within the range now being threaded, can be threaded by power instead of manually, to thereby not only increase the speed of operation of the threading machine but also to eliminate the laborious effort heretofore necessary.

One feature of this invention is to provide such a device that can be rigidly attached to the pipe threading machine so as to rotate with revolving parts of the latter while it is driving the same; and to permit of the use of a light duty motor that is portable, and which can serve in other capacities when not in use for driving the threading machine.

In many of the present pipe threading machines, the shaft that is geared to revolve portions of the machine is disposed radially of and parallel with the axis of rotation of the revolving parts, which axis is coincident with the axis of the fixedly held pipe being threaded. It is a feature of this invention to provide a driving connection located substantially axially with respect to the axis of rotation of the revolving parts of the threading machine with gear or toothed means extending radially and into driving relation with the shaft of the threading machine. Thus, by disposing the driving connection substantially axially of the threading machine I am able to use a portable motor and minimize wobbling of the connection between the motor and said driving connection.

It is a further feature of the invention to provide a base or base plate, for the device of this invention, with means whereby a relatively high speed gear reduction can be used for threading relatively small diameter pipes, and whereby a relatively low speed gear reduction may be used for threading relatively large diameter pipes.

The invention has many other objects and features which will be more fully described in connection with the accompanying drawings and which will be more particularly pointed out in and by the appended claims.

In the drawings:

Fig. 1 is a view in side elevation showing my device attached to a well known type of pipe threading machine and illustrating the pipe as being fixedly held while it is being threaded.

Fig. 2 is a sectional view on line 2—2 of Fig. 1, looking toward the left of the latter as indicated by the arrow, and showing the high speed gear train.

Fig. 3 is a view similar to Fig. 2, with the threading machine omitted, and showing the base plate equipped with a low speed gear assembly.

Fig. 4 is a fragmentary view of a portion of the base plate showing the location of the holes for centering the main driving pinion for the high and low speed gear assemblies.

Fig. 5 is a sectional view of the main driving pinion on line 5—5 of Fig. 2, and illustrating, in schematic form, the high speed train or gear assembly through which drive is transmitted to the stock driving shaft.

Fig. 6 is a view similar to Fig. 5, with the parts in elevation, and showing, in schematic form, the low speed train or gear assembly.

Fig. 7 is a sectional view on line 7—7 of Fig. 1, looking toward the right of the latter.

Like characters of reference designate similar parts throughout the different figures of the drawings.

I have shown the device of this invention attached to what is known in the trade as the Toledo pipe threading machine, which was patented June 28, 1904, by Patent No. 763,568.

I shall very generally describe this machine to an extent necessary to show how the device of my invention operates therewith, but it will be understood that the device of my invention is adapted for attachment, or incorporation, in many other types of pipe threading machines.

I have shown at 1, a pipe that is being threaded, and a fragment of a supporting device such as a vise at 2, in which the pipe 1 is fixedly held in a substantially horizontal position and against rotative movement. In this, and most other types of machines, the pipe being threaded functions to support the machine.

A pipe ring is indicated at 3 and it surrounds pipe 1 with a clearance corresponding to the range of diameter of pipes to be threaded and said ring is provided with three centering lugs 4 which project from the periphery of said ring. A centering ring 5 is mounted on said lugs 4 and is provided with three bosses 6 through which centering screws 7 extend, one screw for each lug, and said screws have threaded engagement with said bosses and ring 5 and extend through ring 3 for engagement at three equi-distant peripheral points against the pipe 1. Thus, the centering screws engage the pipe 1 and center and support said rings and portions of the machine, to be presently described, in concentric relation with pipe 1. Said bosses 6 are secured or formed integral with a stock gear wheel 8 which is non-rotatively supported by said bosses 6 in a fixed position. Thus far, I have described the fixed and non-rotatable parts of the threading machine.

The revolving member or portion thereof includes what I will term the stock 9, which is a shell that surrounds the fixed gear 8 and which is provided with a radially off-set or eccentrically disposed bearing portion 10, in which is disposed what I will term a crawling pinion 11 mounted on a stock driving shaft 12 that is journalled in a suitable bearing 13 fixed in said stock 9. It will be seen that the stock 9 is substantially rearwardly disposed with respect to the remainder of the threading machine, and its driving shaft 12 therefore extends forwardly in parallel relation to the revolving axis of said stock 9, which axis is coincident with the longitudinal axis of pipe 1.

Spider guiding posts 14, 15, 16, 17 and 18 are fixed to said stock 9 and project forwardly from the right thereof, viewing Fig. 1, and for purposes of the claims may be considered a part of the stock 9. A thread die carrying spider 19 is slidably mounted on said posts to be moved from the Fig. 1 position rearwardly toward the stock 9, as the threads are being cut. What is termed a leader, indicated at 20, is fixedly mounted on the spider 19 and consists of a cylindrical shell having exterior threads, and said leader of course moves with said spider 19 and need not be further described as it forms no part of the present invention.

The spider 19 is provided with a series of thread cutting die holders equal in number to the number of posts 14 to 18, and those holders that are visible are indicated at 21, 22 and 23, and in each holder is disposed a thread cutting die, indicated at 25, 26 and 27, and said dies extend radially inwardly and engage the periphery of pipe 1 to form the threads as the spider revolves, a portion of the threads being shown at 28 in Fig. 1.

The stock driving shaft 12 extends through a sleeve 29, which is a fixed part of bearing 13, and the forward end 30 of said shaft is polygonal in form. Said spider 19 has an eccentrically disposed hub 31 that is slidable on said sleeve 29.

Now it will be clear that when rotary motion is applied to shaft 12, pinion 11 will advance peripherally about gear 8, thereby imparting revolving motion to stock 9, leader 20 and spider 19, and these parts will be held in concentric relation to pipe 1 by engagement of the thread cutting dies 25, 26 and 27, or in other words, the full complement of dies including those not shown, and as the threads are being cut, the spider 19 is advanced thereby toward stock 9.

All of the foregoing constitutes substantially the structure of a pipe threading machine as now in use and having, broadly, the constituent parts just described, all of which disclosure is necessary to an understanding of the device of this invention which will next be described.

Either as a part originally incorporated in the machine, or as an attachment, my invention includes a base or base plate 32, which, as shown, is disposed in a plane substantially transverse to or at right angles to the longitudinal axis of the pipe 1, and the revolving parts heretofore described. Further, it is a feature of this invention to rigidly secure or anchor the base plate to the stock so that the base plate will rotate with the stock, as well as being supported thereby. It is a further feature to extend the base plate 32 across or abreast of the axis of rotation of the revolving parts so as to form a mounting for an important part of the invention to be later described.

In the present form, said base plate 32 is roughly of triangular form, and while this form is very advantageous it is not essential to a successful embodiment of the invention, although in the present form of the invention this base plate affords a tri-point anchorage which readily permits access of the operator to oil portions of the pipe being threaded. As shown, the plate 32 has one leg or limb 33 provided with an aperture through which an anchor pin 34 extends, the same having a reduced end 35 which fits into a suitable socket formed in the end of post 14, as shown in Fig. 1. The outer end of pin 34 has a suitable head or nut 35. Limb 36 of said plate 32 is likewise provided with an anchor pin which functions in the same manner and only the head of which is shown at 37, the shank of which enters post 16. Said plate has a limb 38, which extends radially outwardly and downwardly and is of enlarged size with respect to limbs 33 and 36, and is provided with an opening 39 which fits about shaft 12, and against the end of sleeve 29. Thus, it will be seen that shaft 12 functions, in addition to its normal capacity, as a third of the tri-point anchorages for plate 32.

Now it will be clear that while the plate 32 is anchored to radially outward portions of the stock, said plate has a central portion that extends across the revolving axis of said stock and abreast of the end of the pipe. Further, said plate has at least one lateral portion, namely one of the concavely curved peripheral portions in this case, which is disposed radially inwardly of the points of anchorage, or in other words, disposed sufficiently inwardly of the points of anchorage of the plate so that the portion of the pipe being threaded will be accessible for oiling and inspection throughout the threading operation, it being understood that the revolving speed of the stock is relatively very slow.

Reference will next be made to the manner and means whereby power is applied through a speed reduction means in a location axially of the revolving axis and then transmitted radially to the stock driving shaft 12.

Said plate 32 has a supporting portion formed by an aperture 40 (Fig. 4) which is coaxially disposed with respect to the revolving axis of stock 9. A stud shaft 41 (Fig. 5) is suitably fixed in said aperture and has a head 42. A power transmission shaft is provided which will afford any required flexibility and which is provided with a universal joint for that purpose, and said shaft has a socket section 43 that is journalled on said shaft 41 and is provided with one unit 44 of a universal joint. Said socket section 43 has fixed thereon a power driving pinion element which, as shown, consists of a relatively small size pinion 45 which is inwardly disposed, and a relatively large size pinion 46 which is relatively outwardly disposed. The smaller pinion 45 functions for the relatively slow speed reduction and the larger pinion 46 for the relatively high speed reduction, as will later appear. The power connecting end of the power shaft is indicated at 47 and the free terminal thereof will be connected up with any suitable source of power, such as an electric motor, which may be, and usually is portable. Said section 47 is provided with the companion unit 48 of the said universal joint and is, like unit 44, pivoted to a suitable link 49, as will now be clear.

While a flexible power transmission shaft is both convenient and advantageous where a portable motor is employed in order to compensate for lack of alinement, it is not always essential in cases where a motor has an effective temporary mounting that affords a reasonable alinement of parts. However, since this mechanism is not of a precision nature, it will be clear that the feature of locating the power drive axially to the axis of rotation of the stock is of great importance irrespective of whether the power shaft is flexible or not.

The pinions 45 and 46 form the power or driving gear terminals of the low and high speed reduction trains, respectively, to be later described. The transmitting gear terminal for both trains consists of a gear wheel 50, having a hub 51 which is provided with a bore of polygonal form that snugly fits the polygonal end 30 of the stock driving shaft 12, and in practice this wheel is held in position wholly by friction and also holds the plate 32 in position so that the pins 34 and 37 need not be longitudinally anchored in their respective posts.

In threading pipes of two and one-half inches in diameter up to three inches, it is a feature of the invention to use a relatively high speed gear reduction, which is also efficient on any pipes of smaller diameter. On pipes up to four inches in diameter I employ a relatively low speed reduction. The above is about the range of any pipe threading machine of one size, and for larger pipes of from four to six inches in diameter a larger size machine is used, but of course this feature of inter-changeable gear trains is equally adapted for any size threading machine and I will next describe this inter-changeable feature.

First describing the high speed reduction train, and with reference to Figs. 2 and 5, 52 designates an intermediate or first reduction unit or gear which is relatively large and which meshes with driving gear 46. Fixed on said gear 52 is a smaller and second reduction unit or gear 53, which meshes with the master gear or transmitting unit of the train, as indicated at 50. As shown in Fig. 1, gears 52 and 53 are revolvably mounted on a journalling device which may be a shaft 54, which may be in the form of a bolt which is extended through a suitable supporting portion or aperture 54' in plate 32, and has a head 55 and a nut 56. Thus, it will be seen that all the gears just described are rotatively mounted abreast of and parallel with plate 32.

It will now be seen, especially from the schematic view of Fig. 5, that with this high speed gear reduction the pinion 45 does not function, and it will be clear from Fig. 2 that power has been transmitted from pinion 46, which is axially disposed with respect to the revolving axis of stock 9, in a direction radially abreast of plate 32, and transversely of the longitudinal axis of the threading machine toward and to the stock driving shaft 12.

Reference will next be made to the manner and means for establishing a low gear reduction and at the same time retaining the power driving pinions or power element in axial relation to the axis of rotation of the stock.

Referring to Figs. 3 and 6, it will be seen that driving pinion 45 is active and driving pinion 46 is inactive, and I have provided an idler gear 57, slightly larger than pinion 45 and which is mounted on a stud shaft 58, disposed in a supporting portion or opening 59 in plate 32, the shaft 58 being identical with shaft 54, and therefore need not be described in detail. This is the first reducing unit and its function is mainly to obtain the correct direction of rotation of the master gear 50, which is a clockwise direction, as indicated by the arrows. Gear 57 meshes with driving pinion 45 and with a larger gear 59' which is mounted on a stud shaft 60, disposed in opening 61 of plate 32. This gear 57 has a small pinion 62 fast thereto, which meshes with a larger gear 63. Gear 63 is slightly smaller in diameter than gear 52, of the high speed reduction, so that the former will escape mesh engagement with driving pinion 46, but it is mounted on the same stud shaft 54 as is gear 52. Thus, in changing from high to low, or vice versa, gears 52 and 63, will be interchanged as will now be clear.

Fixed to gear 63 is a smaller piston 64 which meshes with the gear terminal or master gear 50, and affords the last reduction unit of the train. It will now be seen that in both gear reductions the driving element consisting of pinions 45 and 46, which rotate clockwise, viewing Figs. 2 and 3, and the master gear 50 also rotates clockwise, viewing said figures, whereby drive in this direction will be imparted to the stock driving shaft 12.

It will now be clear that with one base or base plate 32, I am able to utilize different speed reduction means without changing to another base plate. Thus, with this single equipment, I am able to apply the device of this invention so that the pipe threading machine can efficiently function on any diameter pipe within its range. It will be readily understood from the foregoing how larger size pipe threading machines can be equally equipped. It will also be clear that while I have shown reduction means in the form of toothed gears, still I regard any other toothed elements, such as worm drives, as being within the scope of this invention.

It is believed that the operation of the device of this invention will be clear from the foregoing but it will be briefly recapitulated as follows:

Considered as an attachment, the pipe machine may first be adjusted and the pipe located and anchored in the usual manner, whereupon my improved base plate will be installed as shown in Figs. 1 and 2. The desired type of reduction means may be selected and installed on the plate

32, either before or after the latter has been mounted on the pipe machine. Any available type of prime mover will of course be suitably mounted in line with the axis of rotation of the revolving parts, and the driving element consisting of pinions 45 and 46 will be inserted onto stud shaft 41, in mesh with whichever gear reduction is selected and installed.

When power is thus applied the operation of the pipe threading machine will be continuous until the pipe has been threaded, and a great deal of time will be saved because the pipe machine can be operated not only continuously, but at the maximum speed that is practical, and with the attention of only a single operator.

When the device of this invention is incorporated in the structure of the pipe threading machine, when the latter is originally manufactured, the operation will be substantially identical with the description heretofore made.

While I have herein shown and described one specific form of this invention, I do not wish to be limited thereto except for such limitations as the claims may import.

I claim:

1. In a speed reduction power drive mechanism for a pipe threading machine having a rearwardly disposed stock rotatable about the fixedly held pipe being threaded and provided with means for holding thread cutting dies and having a plurality of guiding posts for said means, gearing for rotating said stock and having a stock driving shaft extending forwardly and in parallel relation to the axis of rotation of said stock, the combination with a tri-point base plate having one limb mounted on said drive shaft, devices for mounting the remaining two limbs of said plate to a corresponding number of said posts whereby said base plate will revolve with said stock, a train of speed reduction gears rotatably mounted on and abreast of said plate and one gear terminal of said train being mounted on said stock driving shaft, and a driving pinion mounted on and abreast of said base plate substantially axially of the axis of rotation of said stock and meshing with the remaining gear terminal of said train, and said driving pinion having a flexible shaft adapted for connection with a portable motor to transmit rotary drive to said stock.

2. In a speed reduction power drive mechanism for a pipe threading machine having a gear driven stock rotatable about the fixedly held pipe being threaded and a stock driving shaft, the combination of a base plate non-rotatively mounted on and bodily rotatable with said stock, a speed reduction means extending radially across said base plate and having driving connection with said stock driving shaft, and a driving connection for said means disposed substantially axially of the axis of rotation of said stock for transmitting rotary drive to the latter.

3. In a speed reduction power drive mechanism for a pipe threading machine having a member revolvable about the axis of a fixedly held pipe being threaded and provided with a drive shaft, the combination with a base fixed to and revolving with said member, a speed reduction means mounted on said base and having a driving connection with said drive shaft, and a driving connection for said means disposed substantially axially of the axis of rotation of said member for transmitting rotary drive thereto.

4. As a new and useful article of manufacture of the class described, a rotatable base plate having radially outwardly extending limbs for attachment to a revolving member of a pipe threading machine to rotate with said member, a speed reduction means journalled on said plate and extending radially from the rotating axis thereof, and a driving device journalled on said plate and being substantially axially disposed with respect to the axis about which said plate is adapted to rotate.

5. As a new and useful article of manufacture of the class described, a rotatable base plate having portions for attachment to the revolving member of a pipe threading machine to revolve with said member, a driving device journalled on said plate in substantial axial relation to the axis of rotation of said plate, and a speed reduction means journalled on said plate and extending radially from the rotating axis thereof and being disposed in driven relation with said driving device.

6. In a speed reduction power drive mechanism for a pipe threading machine having a stock rotatable about the fixedly held pipe being threaded and a stock driving shaft, the combination with a base plate non-rotatively mounted on and bodily rotatable with the stock and having a central portion extending substantially transversely across the end of the pipe and provided with a lateral portion disposed radially inwardly sufficiently to render the threaded portion of the pipe accessible for oiling and inspection during the threading operation, a train of speed reduction gears rotatably journalled on said plate and one gear terminal being mounted on said stock driving shaft, a driving pinion journalled on said plate substantially axially of the axis of rotation of the stock and meshing with the remaining gear terminal of said train, and a shaft for said pinion adapted for connection with a portable motor for transmitting rotary drive to said stock.

7. In a speed reduction power drive mechanism for a pipe threading machine having a driven stock rotatable about the fixedly held pipe being threaded and a stock driving shaft, the combination with a base plate non-rotatably anchored on the stock at points radially outwardly from said pipe and having a central portion extending substantially transversely across the end of said pipe and provided with a lateral portion disposed radially inwardly from the points of anchorage of said plate sufficiently to render the threaded portion of the pipe accessible for oiling and inspection during the threading operation, a train of speed reduction gears for driving said shaft and certain of said gears being rotatively journalled on said plate including a driving pinion with the latter disposed substantially axially of the axis of rotation of the stock, and means for imparting drive to said pinion.

8. In a change speed reduction power drive mechanism for a pipe threading machine having a driven stock rotatable about the fixed axis of the pipe being threaded and a stock driving shaft, the combination with a base plate structure non-rotatively mounted on and bodily rotatable with said stock with the axis of rotation of said structure alined with the axis of rotation of said stock, said structure including interchangeable and different speed transmission means for selective use and either thereof being adapted to extend radially of said structure from its axis of rotation to said stock driving shaft, whereby the latter may be driven at different speeds dependent upon the speed transmission means used.

9. In a change speed reduction power drive mechanism for a pipe threading machine having a driven stock rotatable about the fixed axis of the pipe being threaded and a stock driving shaft, the combination of a base plate structure non-rotatively mounted on and bodily rotatable with said stock, said base plate structure including journalling devices for rotatively mounting intermediate trains of gears of different sizes and speed dependent upon the gear train selected, a power transmission shaft journalled on said structure in substantial axial relation with the axis of rotation of said stock and said transmission shaft having driving pinions of different size adapted to be selectively meshed with one terminal gear of the gear train used, and a master gear mounted on said stock driving shaft and adapted to mesh with the remaining terminal of the gear train used.

10. In a change speed reduction power drive mechanism for a pipe threading machine having a driven stock rotatable about the fixed axis of the pipe being threaded and a stock driving shaft, the combination of a base plate non-rotatively mounted on and bodily rotatable with said stock and disposed substantially transversely of the axis of rotation of the latter, said plate having a plurality of supporting portions, a plurality of gear journalling devices adapted to be selectively fixed in said supporting portions for rotatively mounting intermediate trains of gears of different sizes and speed with the gears of different trains in different positions on said plate dependent upon the gear train selected, a power transmission shaft journalled on said plate in substantial axial relation with the axis of rotation of said stock and said transmission shaft having driving pinions of different size adapted to be selectively connected with one terminal of the gear train used, and a master gear mounted on said stock driving shaft and adapted to mesh with the remaining terminal of the gear train used.

P. L. CALVERT.